United States Patent [19]

Crossley et al.

[11] Patent Number: 4,965,842
[45] Date of Patent: Oct. 23, 1990

[54] METHOD AND APPARATUS FOR MEASURING FEATURE DIMENSIONS USING CONTROLLED DARK-FIELD ILLUMINATION

[75] Inventors: P. A. Crossley, Palo Alto; H. Keith Nishihara, Los Altos, both of Calif.

[73] Assignee: Schlumberger Technologies, Inc., San Jose, Calif.

[21] Appl. No.: 132,528

[22] Filed: Dec. 14, 1987

Related U.S. Application Data

[63] Continuation-in-part of Ser. No. 888,535, Jul. 22, 1986, abandoned.

[51] Int. Cl.$^5$ .............................................. G06K 9/00
[52] U.S. Cl. ......................................... 382/8; 382/1; 382/22; 382/42; 358/107; 356/373
[58] Field of Search ................... 382/8, 22, 27, 41, 42, 382/48, 54; 358/107; 356/373, 375, 381

[56] References Cited

U.S. PATENT DOCUMENTS

| | | | |
|---|---|---|---|
| 3,513,444 | 5/1970 | Henderson et al. | 356/157 |
| 3,617,625 | 11/1971 | Redpath | 380/42 |
| 4,386,411 | 5/1983 | Risk et al. | 358/101 |
| 4,394,683 | 7/1983 | Liptay-Wagner et al. | 358/107 |
| 4,399,205 | 8/1983 | Bergendahl | 430/30 |
| 4,403,859 | 9/1983 | Ernst | 250/237 G |
| 4,441,207 | 4/1984 | Lougheed et al. | 382/8 |
| 4,442,188 | 4/1984 | Chiang | 356/401 |
| 4,472,786 | 9/1984 | Larson | 364/822 |
| 4,531,060 | 7/1985 | Suwa | 250/557 |
| 4,549,084 | 10/1985 | Markle | 250/548 |
| 4,568,189 | 2/1986 | Bass | 356/401 |
| 4,568,977 | 2/1986 | Chamberlain et al. | 382/54 |
| 4,573,191 | 2/1986 | Kidode et al. | 382/1 |
| 4,626,907 | 12/1986 | Schedewie | 356/401 |
| 4,633,504 | 12/1986 | Wihl | 382/54 |
| 4,636,626 | 1/1987 | Hazawa et al. | 250/557 |
| 4,648,120 | 3/1987 | Chittineni | 382/54 |
| 4,652,134 | 3/1987 | Pasch | 356/401 |
| 4,654,872 | 3/1987 | Hisano et al. | 382/1 |
| 4,685,071 | 8/1987 | Lee | 364/526 |
| 4,693,607 | 9/1987 | Conway | 356/380 |

OTHER PUBLICATIONS

Pending patent application Ser. No. 06/889,055, filed Jul. 22, 1986, titled "Mask Alignment and Measurement of Critical Dimensions in Integrated Circuits", inventors H. Keith Nishihara and P. Anthony Crossley.

Pending patent application Ser. No. 07/117,704, filed Nov. 5, 1987, titled "Method of Directly Measuring Area and Volume Using Binocular Stereo Vision", inventors P. Anthony Crossley, H. Keith Nishihara, and Neil D. Hunt.

"Image Understanding" Proceedings of a Workshop Held at Washington D.C., Apr. 23, 1981, Science Application, Inc., Report No. SAI-82-391-WA, Lee S. Baumann, Workshop Organizer and Proceedings Editor.

*Primary Examiner*—David K. Moore
*Assistant Examiner*—Jose L. Couso
*Attorney, Agent, or Firm*—Townsend & Townsend

[57] ABSTRACT

A method and apparatus for measuring feature dimensions uses selective dark-field illumination to illuminate a target from a single direction at a low angle to the plane of the target. Opposing edges of the target elements are distinguished and captured in separate images. The images are filtered using a Gaussian convolution operator and a Laplacian operator. The signs of the filtered images are correlated at various offsets. The relative displacement of the images which produces the maxium correlation value is used to calculate the average dimension of the target elements.

16 Claims, 4 Drawing Sheets

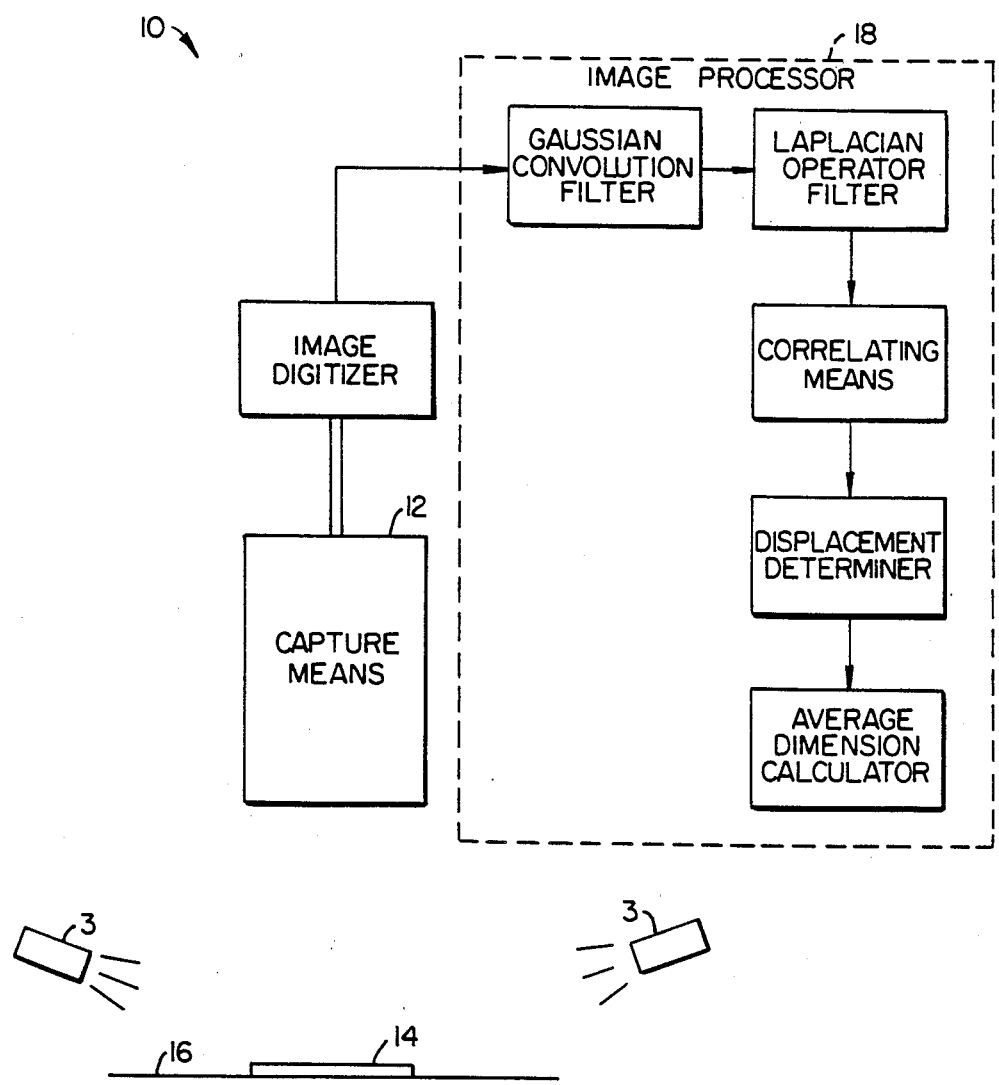
FIG._1.

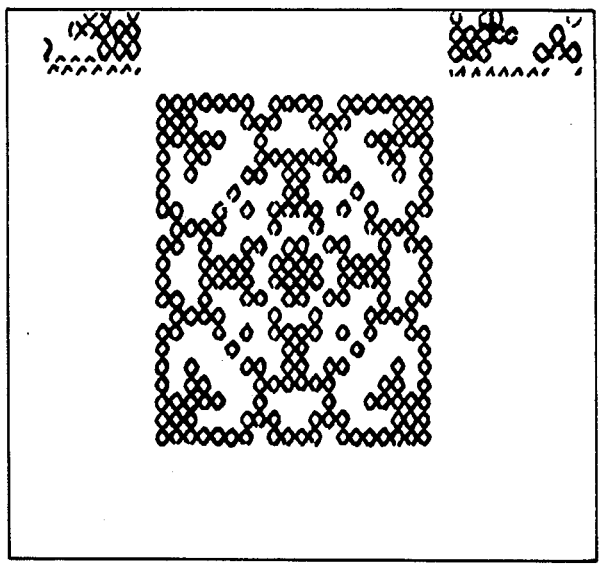
FIG._2.
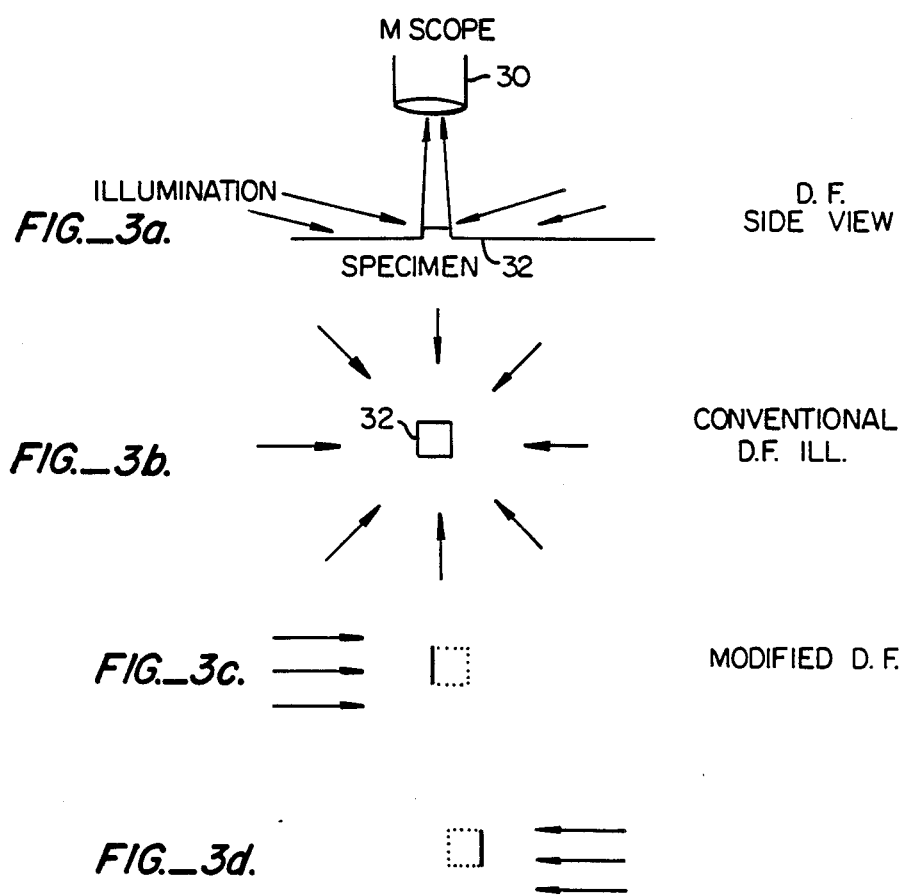

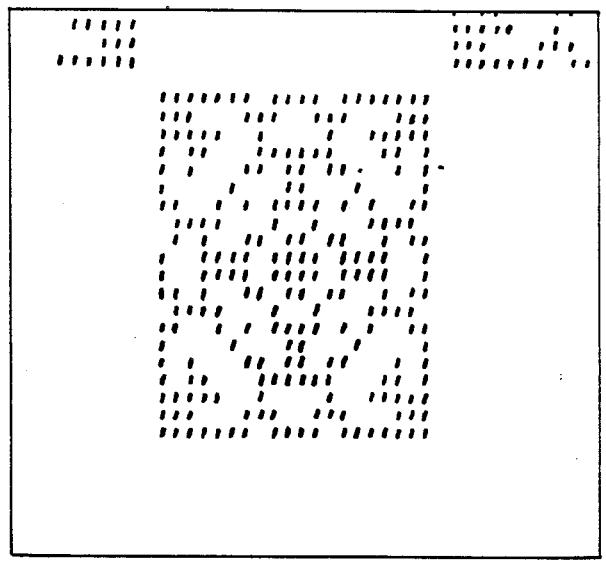
FIG._4.
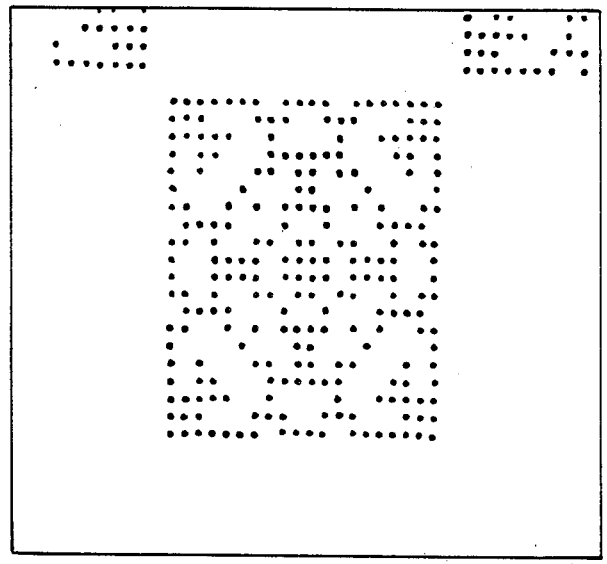
FIG._5.

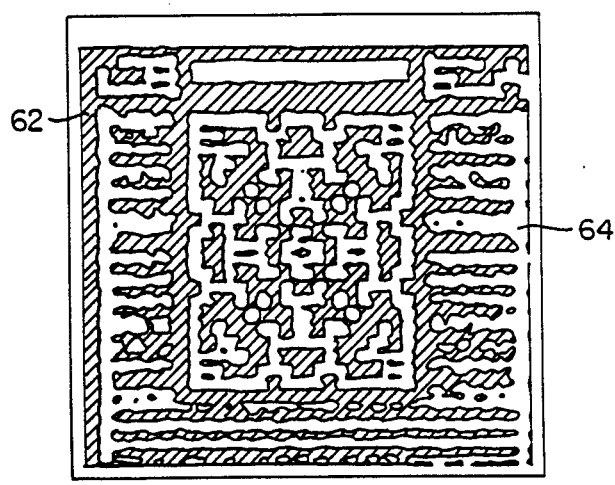
FIG._6.
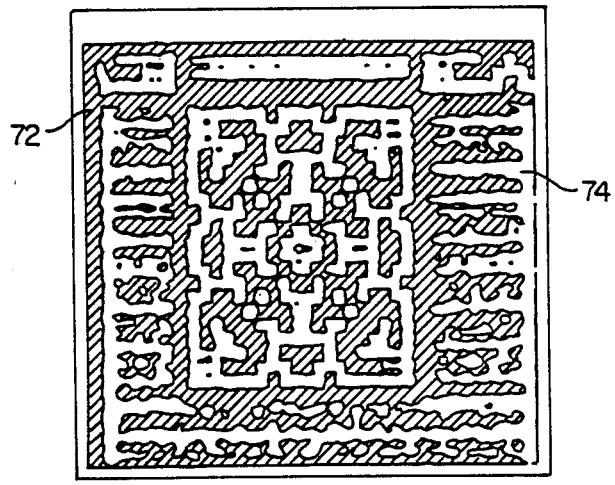
FIG._7.
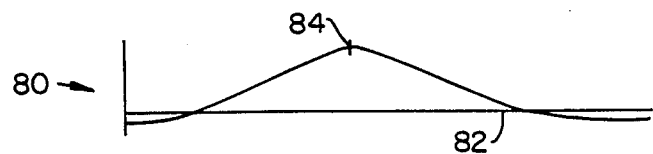
FIG._8.

METHOD AND APPARATUS FOR MEASURING FEATURE DIMENSIONS USING CONTROLLED DARK-FIELD ILLUMINATION

CROSS-REFERENCE TO RELATED APPLICATION

This application is a continuation-in-part of U.S. patent application Ser. No. 888,535, filed Jul. 22, 1986, and entitled, "System for Expedited Computation of Laplacian and Gaussian Filters and Correlation of Their Outputs for Image Processing " now abandoned.

BACKGROUND OF THE INVENTION

This invention relates generally to the measurement of feature dimensions, and specifically, it relates to the measurement of feature dimensions without manual intervention using dark-field illumination to distinguish the edges of a feature and using image processing techniques to measure the disparity between opposing feature edges.

Dark-field microscopy is a technique in which an illumination source provides a convergent cone of light at a low angle to the plane of the specimen, centered on and symmetrical about the optical axis of the imaging system. The image is formed by collecting and focusing only that light which is scattered from topographic feature edges on the specimen. Since flat areas reflect rather than scatter, they appear dark in the image, while feature edges appear light.

In the prior art, techniques are known for extracting the dimensional information from the images generated by dark-field microscopy without manual intervention. Generally, these known techniques analyze the image to discriminate the opposing feature edges and calculate the distance between the opposing edges. These techniques use either a single scan line from the image or the average of multiple scan lines to reduce the effects of high-frequency noise. Typically, a target in the shape of a single rectangle is scanned and the resulting data is analyzed to identify the opposing edges. By focusing attention on detailed analysis of the feature edges, however, such prior art techniques have certain inherent limitations. Firstly, since the information representing the details of the edges are carried in the high spatial frequency region of the image spectrum, limited and laborious techniques for high frequency noise reduction are required. Secondly, the results are sensitive to the details of the contrast formation mechanism of specific samples and tend to vary from one type of specimen to another or even for different specimens of the same type. Thirdly, the contrast formation is sensitive to the illumination and other parameters of the imaging equipment, such as focus, so that results from a single specimen will be different depending on the settings.

SUMMARY OF THE INVENTION

The present invention provides a method and apparatus for measuring feature dimensions using selective dark-field illumination to distinguish opposing feature edges and using image processing techniques to measure the dimension between opposing feature edges. The standard dark-field illumination technique is modified to illuminate a target from a single direction at a low angle to the plane of the target. By selectively illuminating the target from opposing directions, the opposing edges of the target elements are segregated and captured in separate images. The separate images are then correlated at various offsets to determine the relative displacement of the images which produces the maximum correlation value. This displacement is proportional to the average dimension of the target elements.

In a typical application, this technique is used to measure critical feature dimensions in the manufacture of integrated circuits. The target is composed of elements having the same size as the smallest features of the integrated circuit.

In a preferred embodiment, the images obtained by selective dark-field illumination are each filtered before performing the correlation. The filtering method used in this embodiment applies a Gaussian convolution operator and a Laplacian operator to the image. The signs of the filtered images are stored and used in the correlation.

BRIEF DESCRIPTION OF THE DRAWINGS

FIG. 1 is a representation of an apparatus for measuring feature dimensions.

FIG. 2 is a conventional dark-field illumination image of a target.

FIGS. 3a–3d are schematic illustrations of conventional and selective dark-field illumination techniques.

FIG. 4 is a photomicrograph of the target shown in FIG. 2, using selective dark-field illumination.

FIG. 5 is a photomicrograph of the target shown in FIG. 2, using selective dark-field illumination.

FIG. 6 is the image of FIG. 4 after filtering.

FIG. 7 is the image of FIG. 5 after filtering.

FIG. 8 is a correlation plot of FIGS. 6 and 7.

DETAILED DESCRIPTION OF THE PREFERRED EMBODIMENT

FIG. 1 is a schematic representation of an apparatus 10 for measuring feature dimensions using controlled dark-field illumination. An image acquisition system 12 is aimed at a target 14 contained on specimen 16. Image acquisition system 12 is coupled to an image processing system 18. Target 14 provides an artifact whose image can be analyzed to measure the dimensions of the features (elements) of which it is composed.

In one application of this invention, the target is used for measuring the dimensions of features in integrated circuit photolithography. In the manufacture of integrated circuits, the critical dimensions are those of the minimum feature size. Therefore, for this application, the target is composed of elements having the same size as the smallest features of the integrated circuit pattern which is being printed. The target is printed using the same processes used to print the integrated circuit, thereby providing a measure of the accuracy of the processes.

The spatial geometry of target 14 can be optimized to exploit the properties of the image processing technique to be described herein. This image processing technique operates optimally when the spatial frequency spectrum of the image is spread evenly throughout the band width of the imaging system. This condition is approximated by composing the target as a regular orthogonal array of potential elements, and populating the actual target by randomly filling 50% of the potential locations. Therefore, in this embodiment, the target is constructed by composing an array of dots with a dimension along their diameter equal to the minimum feature size of the integrated circuit (nominally one micron), and randomly placing these dots on a square grid of potential locations 2.5 microns apart on their centers. To facilitate identification of the target, the elements which compose the target are placed in a four-fold symmetric arrangement. The resulting target is illustrated in FIG. 2. It will be understood, however, that there is considerable flexibility in the design of the target.

Image acquisition system 12 comprises image illumination means and an image capture system. The illumination means may be any means for selectively illuminating opposing edges of the features to be measured. The particular image capture system is immaterial, provided it produces a digitized grey-level representation of the illuminated target.

In this embodiment, image acquisition system 12 comprises an Olympus metallurgical microscope having a 20x field objective lens and illuminator, with a camera mounted on the trinocular head of the microscope to record the image. The camera is an RCA series TC-1005 with a high sensitivity Ultricon tube. A 6.7x camera eyepiece is used.

The illumination source of this dark-field microscope normally provides a convergent cone of light at a low angle to the plane of the specimen, nominally centered on and symmetrical about the optical axis of the imaging system. The image is formed by collecting and focusing only that light which is scattered from topographic feature edges on the specimen. Since flat areas reflect rather than scatter, they appear dark in the image. FIG. 2 is an example of a conventional dark-field image.

To provide selective dark-field illumination, the standard (360°) dark-field illumination technique is modified, such that the uniform cone of light is replaced by a narrow "pencil" of light at a low angle. This selective illumination selects only those topographic feature edges which effectively scatter light from that direction. Other edges are suppressed in the resulting image. This technique is particularly well-suited for distinguishing opposing edges of the target.

FIGS. 3a-3d illustrate schematically the selective dark field illumination technique. FIG. 3a is a side view of microscope 30 viewing a specimen 32 using conventional dark-field illumination. FIG. 3b is a top view of the specimen 32 when illuminated from 360° using conventional dark-field illumination. All edges, and only the edges, are visible. FIGS. 3c and 3d are top views of the images created by selective dark-field illumination from opposite directions.

In this embodiment, a "pencil" of light is approximated by inserting a sector-aperture in the path of the illuminator, so that most of the cone of illumination is blocked, but a narrow sector is allowed to pass through the microscope optics in the usual way. A sector angle of 60° is used in this embodiment to produce the micrograph shown in FIG. 4, from the same specimen as FIG. 2. By rotating the sector-aperture by 180°, illumination from the complementary direction is obtained, producing the image shown in FIG. 5. The image is then recorded by the camera, digitized, and then processed by the image processing system.

By using selective dark field illumination, the opposing edges of the target are distinguished and captured in two separate images. The two images are then correlated at selected offsets to provide a measure of the average feature dimension, i.e. the average distance between opposing edges of the elements in the target. The offset, or relative displacement of the images (relative to the initial orientation of the captured images), which produces the maximum correlation between the images is proportional to the average feature dimension of the elements in the target.

The accuracy of the correlation measurement can be improved substantially by filtering the images to enhance their low frequency (clustering) structure and attenuate the high frequency (detailed) information. Although many different types of filters may be employed for this purpose, in the preferred embodiment a Gaussian convolution operator is used. The Gaussian convolution employed is a two dimensional Gaussian which functions to low pass filter the image in a way that attenuates high spatial frequencies, while preserving the geometric structure at lower spatial frequencies. The size of the Gaussian operator controls the scale at which structure remains in the filtered image. A Laplacian filter is also employed, to detect the locations in the image where local maxima in the rate of brightness change occur. These locations correspond closely with the locations where the Laplacian has a zero value. Only the signs of the Laplacian are stored and used (in binary form) in the correlation, thereby effectively comparing the zero crossings of the Laplacian of the convolved signals.

Because the order of application of the Laplacian and Gaussian operators does not affect the result of the filtering operation, either the Laplacian or the Gaussian operator may be applied first. Although a suitably programmed general purpose computer can be used to apply the Laplacian and Gaussian convolution operator to the digitized image and take the sign of the result, the image processing means of the preferred embodiment utilizes specialized hardware for this purpose. A method and apparatus for performing the Laplacian of Gaussian filtering is described in the copending commonly assigned U.S. patent application entitled "SYSTEM FOR EXPEDITED COMPUTATION OF LAPLACIAN AND GAUSSIAN FILTERS AND CORRELATION OF THEIR OUTPUTS FOR IMAGE PROCESSING", Ser. No. 888,535, filed Jul, 22, 1986 now abandoned. That application, which is hereby incorporated by reference, describes in detail the method and apparatus employed in this embodiment to perform these calculations. The results of applying this technique to the images of FIGS. 4 and 5 are shown in FIGS. 6 and 7, respectively. The Gaussian convolution was performed with an operator having a center diameter of 16 pixels. In FIGS. 6 and 7, the black areas 62, 72 represent the positive sign and the white areas 64, 74 represent the negative sign.

After the images have been filtered using either the above-described process or some other desired process, the filtered images are correlated with each other. The method and apparatus described in the above-referenced patent application are used by the image processing means of this embodiment to perform binary area correlations to compare the relative position of the sign areas (the sign of the Laplacian of Gaussian convolution in binary form) of FIGS. 6 and 7. The system described in that patent application automatically performs the correlation using various offsets of the two digitized filtered images. The relative displacement of the two which results in the highest correlation may be determined by making as many correlation measurements as desired.

FIG. 8 is a graph 80 of a cross-correlation of FIGS. 6 and 7, obtained by shifting the images in a single direction (represented by the horizontal axis 82) one pixel at a time. The direction of shifting is defined by the dimension to be measured, that is, the dimension between the opposing edges captured in the two images. There is a single peak 84, and the roll-off of correlation with displacement is relatively smooth and linear, which allows sub-pixel interpolation to measure relative displacement with accuracy and precision. To obtain more data and improve accuracy even further, the correlation may be extended in an additional orthogonal direction to plot a correlation surface. The location (on the horizontal axis) of the peak of the resulting cone is then determined using the technique described in the above-referenced patent application, or other techniques known in the art.

The invention has applications beyond the example of measuring critical feature dimensions in integrated circuits. The technique is applicable in any field where directional illumination can select opposing edges of the specimen whose dimensions are required. The specimen must have topographic relief to form the image contrast when illuminated from a low angle. If the topographic relief is in a material transparent to the illumination, then the opposing edges will exhibit only partial segregation when selectively illuminated, because some light will be scattered by the "ghost" edge. This condition results in a measured feature size that is small by a factor of $(a-b)/(a+b)$, where a and b are respectively the integrals of intensity under the illuminated edge and the ghost edge. This bias can be compensated for to the extent these relative weights are known.

Although the circular dots used as target elements in this embodiment produced good results, it may be preferable in some applications to apply a compensating factor to the displacement measurements to account for the distribution of light around the feature circumference. Obviously, the technique is also applicable to features bounded by parallel straight edges, such as rectangles or squares, since this provides the most direct relationship between image correlation displacement and physical feature size.

In summary, selective dark field illumination is used to distinguish and segregate opposing edges of features in separate images, and these images are correlated to measure the feature size (displacement between the edges). This technique renders it feasible to use complex patterns of elements for measuring average feature dimensions. These patterns provide more data for a particular target area and camera field than the single-element rectangular target used in the prior art. These patterns can be adapted for a particular image processing technique to compensate for noise and distortion from the image acquisition system. When a pattern with low spatial frequency content is used with the low frequency image processing techniques described herein, accurate, reproducible results are obtained. By discarding some of the high frequency information, while retaining some of the low frequency information, the measurement is relatively insensitive to small distortions and high frequency noise.

The preceding has been a description of the preferred embodiment of the invention. Although specific details have been provided with respect to the preferred embodiment, these details should be understood as being for the purpose of illustration and not limitation. The scope of the invention may be ascertained from the appended claims.

What is claimed is:

1. A method for measuring an average feature dimension of a target, the target comprising a plurality of elements, the method comprising the steps of:
   illuminating the target from a first direction to scatter light from a first edge of each of the elements;
   capturing a first image by collecting and focusing the light scattered from the first edges;
   digitizing the captured first image;
   illuminating the target from a second direction to scatter light from a second edge of each of the elements;
   capturing a second image by collecting and focusing the light scattered from a second edges;
   digitizing the captured second image;
   correlating the first image with the second image for a selected set of relative image displacements to generate a set of correlation values having a peak value associated with a particular relative displacement of the first and second images;
   determining the particular relative displacement of the first and second images associated with the peak value; and
   calculating the average dimension between the first and second edges of the elements using the particular relative displacement of the first and second images.

2. The method of claim 1 wherein the step of illuminating the target from a first direction comprises the step of illuminating the target at a low angle to the plane of the target from a first direction and the step of illuminating the target from a second direction comprises the step of illuminating the target at a low angle to the plane of the target from a direction opposite the first direction.

3. The method of claim 2 further comprising the steps of:
   filtering the first and second digitized images to remove some of the higher spatial frequencies before the correlating step.

4. The method of claim 3 wherein the step of filtering comprises the step of applying a Gaussian convolution operator to the first and second digitized images.

5. The method of claim 4 wherein the step of filtering further comprises the step of applying a Laplacian operator to the first and second digitized images, whereby the filtering of the first image generates a first set of results and the filtering of the second image generates a second set of results.

6. The method of claim 5 further comprising storing the signs of the results of filtering the images; and wherein the step of correlating comprises comparing the signs of the first set of results to the signs of the second set of results.

7. A method for measuring an average feature dimension of a target, the target comprising a plurality of elements, the method comprising the steps of:
   illuminating the target from a first direction to scatter light from a first edge of each of the elements;
   capturing a first image by collecting and focusing the light scattered from the first edges;
   digitizing the captured first image;
   illuminating the target from a second direction to scatter light form a second edge of each of the elements;
   capturing a second image by collecting and focusing the light scattered from the second edges;
   digitizing the captured second image;

applying a Laplacian operator and a Gaussian convolution operator to the first and second digitized images to generate a first set of results and a second set of results;

storing the signs of the results of applying the Laplacian and Gaussian operators;

correlating the images by comparing the signs of the first set of results to the signs of the second set of results for a selected set of relative image displacements to generate a set of correlation values having a peak value associated with a particular relative displacement of the first and second images;

determining the particular relative displacement of the first and second images associated with the peak value; and calculating the average dimension between the first and second edges of the elements using the particular relative displacement of the first and second images.

8. A method for measuring critical dimensions of features in an integrated circuit comprising the steps of:

printing a target on a surface of the integrated circuit, the target comprising a plurality of elements;

illuminating the target from a first direction to scatter light from a first edge of each of the elements;

capturing a first image by collecting and focusing the light scattered from the first edges;

digitizing the captured first image;

illuminating the target from a second direction to scatter light from a second edge of each of the elements;

capturing a second image by collecting and focusing the light scattered from the second edges;

digitizing the captured second image;

filtering the first and second digitized images;

correlating the first and second digitized images for a selected set of relative image displacements to generate a set of correlation values having a peak value associated with a particular relative displacement of the first and second images;

determining the particular relative displacement of the first and second images associated with the peak value; and calculating the average dimension between the first and second edges of the elements using the particular relative displacement of the first and second images.

9. The method of claim 8 wherein the target comprises a plurality of elements having a low spatial frequency content.

10. The method of claim 9 wherein the filtering step comprises:

applying a Gaussian convolution operator to the first and second digitized images; and applying a Laplacian operator to the first and second digitized images;

thereby generating a first set of results and a second set of results.

11. The method of claim 10 further comprising the step of storing the signs of the results of applying the Laplacian and Gaussian operators and wherein the correlating step comprises comparing the signs of the first set of results to the signs of the second set of results.

12. An apparatus for measuring an average feature dimension of a target, the target comprising a plurality of elements and the apparatus comprising:

illuminating means for illuminating the target from a first and a second selected direction to scatter light from an edge of each of the elements;

capture means for capturing a first image by collecting and focusing the light scattered from the edges when the target is illuminated from the first direction and for capturing a second image by collecting and focusing the light scattered from the edges when the target is illuminated from the second direction;

means for digitizing at least the first and second captured images; and image processing means coupled to the image acquisition means for:

correlating the first image with the second image for a selected set of relative image displacements to generate a set of correlation values having a peak value associated with a particular relative displacement of the first and second images;

determining the particular relative displacement of the first and second images associated with the peak value; and calculating the average dimension between the first and second edges of the elements using the particular relative displacement of the first and second images.

13. The apparatus of claim 12 wherein the image acquisition means comprises:

a dark-field microscope having an illuminator for illuminating a target at a low angle to the plane of the target; and a sector aperture coupled to the illuminator for illuminating the target from a selected direction.

14. The apparatus of claim 12 wherein the image processing means further comprises:

means for filtering the first and second images to remove some of the higher spatial frequencies before the correlating step.

15. The apparatus of claim 14 wherein the filtering means comprises:

means for applying a Gaussian convolution operator and a Laplacian operator to the first and second images to generate a first set of results and a second set of results.

16. The apparatus of claim 15 further comprising means for storing the signs of the results of filtering the images; and wherein the correlating means comprises means for comparing the signs of the first set of results to the signs of the second set of results.

* * * * *